Feb. 25, 1964     G. E. WISE     3,122,129
BIRD FEEDER
Filed Oct. 2, 1961
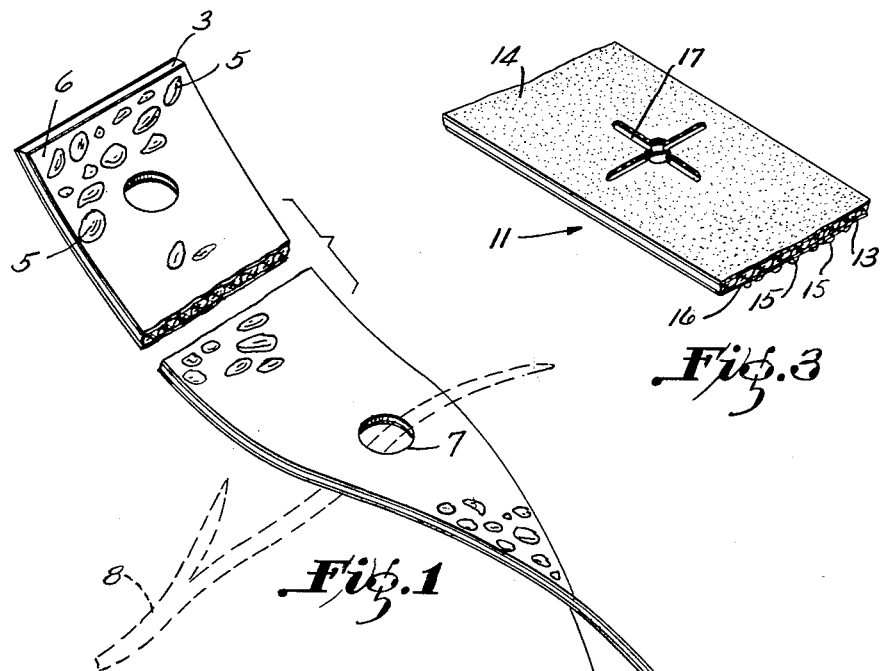
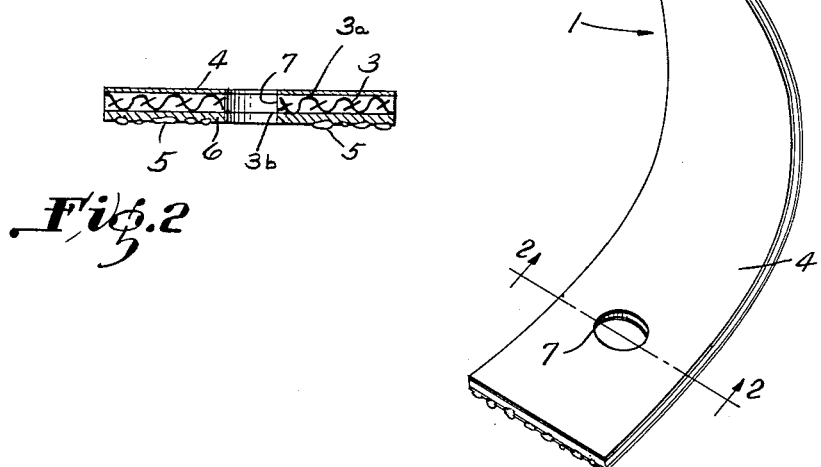
INVENTOR
Glenn E. Wise

United States Patent Office 3,122,129
Patented Feb. 25, 1964

3,122,129
BIRD FEEDER
Glenn E. Wise, 2415 39th Place NW., Washington, D.C.
Filed Oct. 2, 1961, Ser. No. 142,252
8 Claims. (Cl. 119—51)

This invention relates to a bird feeder, and, more particularly, to a food-including tape-like structure, which is primarily adapted to be suspended out of doors from a bush's or tree's limbs, or other convenient location, so as to provide a feeding station for birds. Preferably, the food provided by this invention is in the form of seeds. The seeds are fastened to one face of a fabric or other suitable backing strip by means of an innocuous, edible adhesive. The face of the strip opposite the seeds is provided with means which are intended to render the invention decorative as well as attracting birds to the feeder. At appropriate locations along the tape-like structure, means are provided for fastening same to a tree or the like for use.

One object of the invention is to provide a bird feeder which is economical to manufacture, and which may be discarded after its food supply is exhausted.

Another object of the invention is to provide a strip-like bird feeding device which is constructed so as to include decorative and fastening means whereby the feeder can be supported upon a tree, or the like, somewhat in the way tinsel is used on Christmas trees.

Another object of the invention is to provide a feeder which can be coiled up so as to require very little space for shipment, but which can be easily extended for use.

Another object of the invention is to provide a bird feeder which may include poisoned food means for exterminating undesirable birds.

Another object of the invention is to provide a tinsel-simulating bird feeder simple enough to be placed in use by children, and so devised that children will derive enjoyment and amusement both during the act of placing the feeder in use and thereafter. Other objects will be apparent from the remainder of the specification and from the drawings.

In the drawings which form a part of this specification:

FIGURE 1 is a three dimensional view of one embodiment of the invention;

FIGURE 2 is a sectional view to enlarged scale taken on the line 2—2 of FIGURE 1; and FIGURE 3 is a three dimensional view of a second embodiment of the invention.

Referring now to FIGURES 1 and 2 of the drawings by reference numerals, the first embodiment of my novel bird feeder is designated generally by 1. Feeder 1 includes an elongated, thin backing strip 3. While I prefer to use a fabric webbing such as burlap for forming strip 3, other web-like materials are also well suited. The main requirement for the strip 3 is that it have enough strength, wet or dry, to withstand the pecking of birds until such time as the birds have eaten all of the seeds therefrom.

On one broad face 3a of strip 3 is attached, by means of a suitable, preferably waterproof, adhesive (not shown), a layer of shiny metallic foil 4. This foil layer, which, for example, may be aluminum foil, has its shiniest side exposed, and preferably is co-extensive with the face 3a of strip 3 to which it is attached. The face 3b of strip 3, opposite the face to which the foil layer 4 is fastened, is covered with a great many seeds 5, for example, sunflower seeds, which are attached to strip 3 by means of layer 6 of an innocuous and preferably edible adhesive which may be, for example, casein or gelatin glue, or flour and water paste. The glue or paste layer need be only thick enough to hold the seeds 5 on the strip 3 firmly enough to require a small amount of pecking by birds to dislodge same. If desired, however, the layer 6 may be made thicker and the seeds may be partially or totally embedded in some so that a greater amount of pecking will be required to dislodge the seeds. FIGURE 2 depicts all of the seed/adhesive relationships just described since some of the seeds 5 are shown completely embedded in the layer 6, others of the seeds are partially embedded in layer 6, and still others of the seeds 5 merely have a small portion of their surfaces contacting and held by layer 6.

Along the tape or strip 3, at any desired interval, are formed apertures 7 for the purpose of attaching the feeder 1 to a tree's or bush's limbs or branches. This is accomplished in the manner shown in FIGURE 1 wherein the end of a branch 8, in phantom lines, is shown protruding through one of the apertures 7. (I have found that good results are obtained by spacing apertures 7, 7 at about one foot intervals.)

The feeder of this invention may be produced either in twisted form as shown in FIGURE 1, or in straight flat form as shown in FIGURE 3. The flat form is preferable, however, since it requires less space for shipping, and because it may be easily twisted manually at the time of use. If it is desired, however, to produce the invention in twisted form, it is only necessary to twist a straight, flat length thereof after the foil layer has been rigidly attached to strip 3. The foil 4, upon being twisted, will retain the remainder of the device in twisted form.

To use the form of the invention shown in FIGURES 1 and 2, all that is required is that convenient ends of a tree's or bush's branches be inserted individually through as many of the apertures 7 as a user believes is necessary for maintaining the feeder in position for feeding birds. I have found that it is best to place the feeder under some tension when installing same. This can easily be accomplished by springing the supporting tree or bush branches in such a manner that they will exert a tensioning force on the tape when it is installed. By this expedient the feeder is rendered less apt to be affected or torn loose from its support by the wind or by the pecking of birds thereon.

Once this feeder is installed, it forms a decorative and convenient, tinsel-simulating feeding station for the birds. The shiny face of the foil layer 4 provides a decorative note as well as attracting birds to the feeder. The twists of the tape-like structure are not only decorative, but also serve to react to any breeze or wind so as to cause the feeder to move slightly in an unpredictable manner. Obviously the feeder can be furnished or cut off into any length desired. When all of the seeds have been pecked off of the feeder, the remains may be easily removed from the tree and discarded.

The embodiment of the invention shown in FIGURE 3, and designated generally as 11, differs from the embodiment seen in FIGURES 1 and 2 in several respects. First, the foil layer 4 of the feeder 1 is replaced by a coating of bright paint 14, for example, aluminum paint, on one broad face of a paper backing strip 13. Secondly, this form of the invention is preferably produced in flat, straight form only, as shown. Third, the apertures employed in feeder 11, one of which is seen at 17 in FIGURE 3, are cruciform in shape. This form of aperture, I have discovered, renders the feeder easier to install on trees or bushes having knobby branch ends, since the apertures can be expanded considerably, as required, in order that the branch ends can enter therethrough. The numeral 15 in FIGURE 3 represents seeds attached to strip 13 by means of an adhesive layer 16.

Feeder 11 is installed and operated on by birds in the same manner as described relative to feeder 1. Feeder 11, however, possesses two characteristics which in certain instances make it preferable to feeder 1. First, it is cheaper to produce since the paint coating 14 is cheaper in itself and cheaper to apply than the foil layer 4. Second, if the backing strip 13 is formed of a fairly stiff paper, rather than fabric, the necessity for removing the remains of the feeder 11 from its use position, after the birds have pecked all of the seeds therefrom, is obviated since the birds and elements will attack the painted paper so that it will soon fall to the ground and rot away leaving no permanent unsightly debris. Feeder 11 may be twisted as it is placed in its use position if desired.

While I have illustrated two preferred embodiments of my invention, it is obvious that many changes might be made therein without departing from the spirit thereof as defined by the appended claims. For example, foods other than seeds may be used. Also, it is not intended that the feeders of the invention be restricted to use in or on trees or bushes only. In fact, in some cases it has been found to be desirable to treat either the seeds 5 or 15 or the adhesive layers 6 or 16, or both, with a conventional bird-killing poison. The poison including embodiments of my invention can be hanged in the loft of a barn or elsewhere to serve as an exterminator for killing noxious birds. Such an embodiment, for example, serves as a highly effective means for controlling starlings around a farmstead.

Having now described my invention, what I claim as new and desire to secure by Letters Patent is:

1. A feeder of the character described comprising: an elongated flexible backing strip having a front face and a rear face; attention-attracting means attached to one of said faces; edible material adjacent the other of said faces; and adhesive means joining said edible material to said other face.

2. The combination of claim 1 including means for fastening said feeder in use position on a support above the ground.

3. The combination of claim 1, said attention-attracting means comprising metallic foil attached to said one face by means of an adhesive.

4. The combination of claim 1, said attention-attracting means comprising a coating of bright hue.

5. The combination of claim 1, said attention-attracting means comprising a layer of twisted metallic foil attached to said one face, said foil imparting a twist, corresponding to the twist of said foil, to said backing strip.

6. A feeder of the character described comprising: an elongated flexible ribbon-like backing strip; edible material attached to one portion of said backing strip; visual-attention-attracting means fixed on another portion of said backing strip; and means spaced along said feeder for supporting same in an elevated location for use.

7. The combination of claim 6, said means spaced along said feeder comprising apertures.

8. A feeder of the character described comprising: an elongated flexible backing strip structure twisted about its longitudinal axis to provide curved surface portions on said structure which cause the feeder to move in an unpredictable manner when said portions are subjected to wind currents; means including edible material attached to said ribbon-like backing strip structure; and means spaced along said feeder for supporting said feeder in an elevated position.

References Cited in the file of this patent

UNITED STATES PATENTS

| | | |
|---|---|---|
| 1,990,712 | Rose | Feb. 12, 1935 |
| 2,235,959 | Copeman | Mar. 25, 1941 |
| 2,463,704 | Lloyd et al. | Mar. 8, 1949 |
| 2,808,679 | Collins | Oct. 8, 1957 |